Sept. 4, 1934.  W. F. KEENAN, JR  1,972,593
FURNACE WALL
Filed May 27, 1926   2 Sheets-Sheet 1
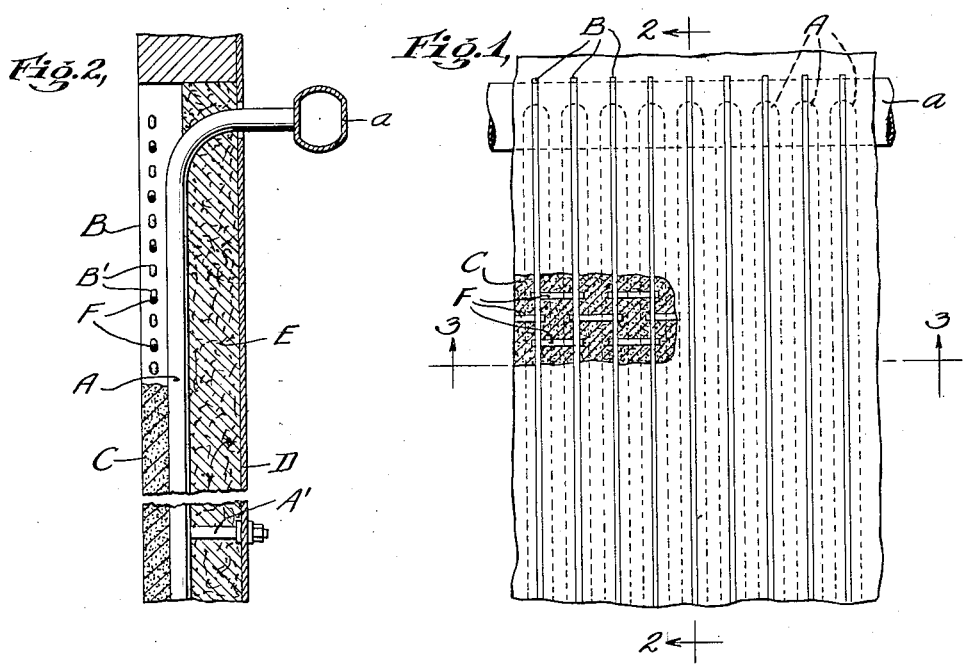
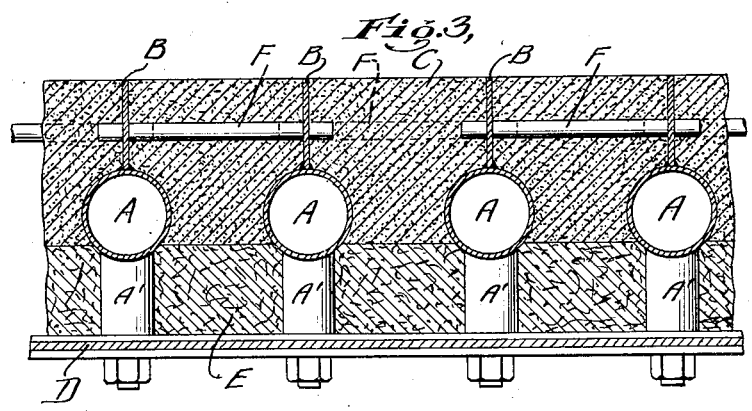
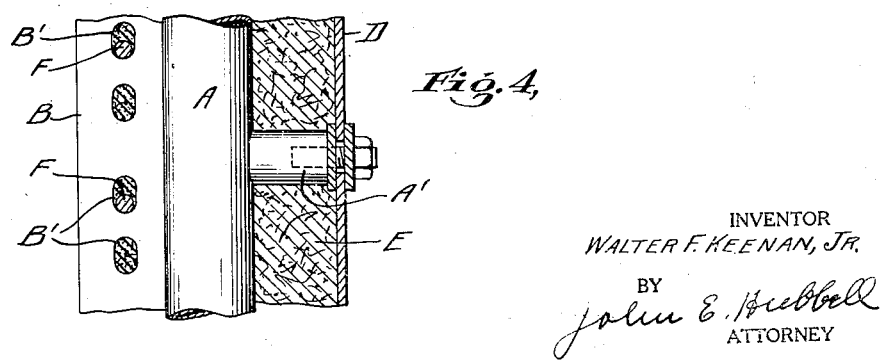
INVENTOR
WALTER F. KEENAN, JR.
BY
John E. Hubbell
ATTORNEY

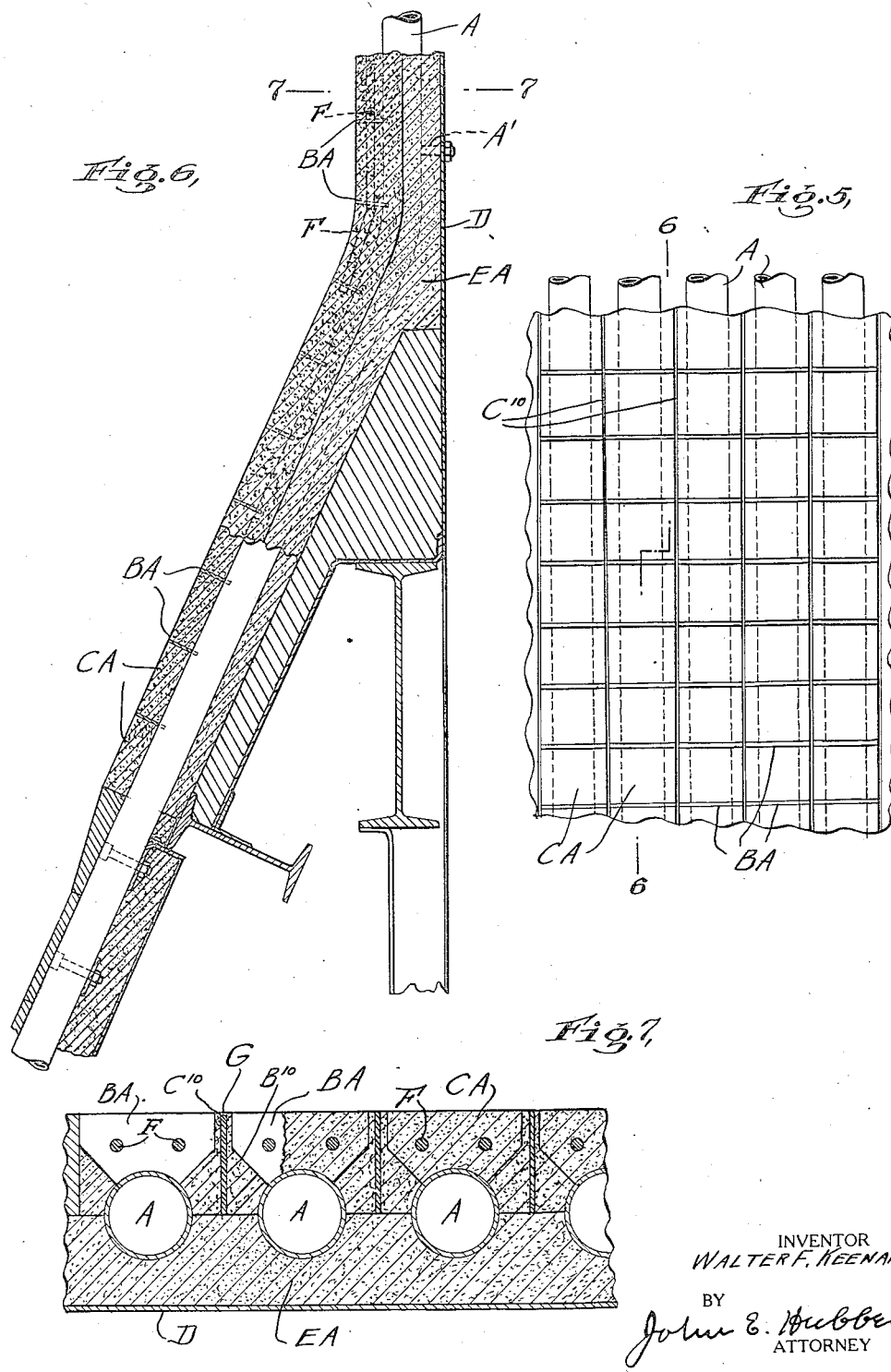

Patented Sept. 4, 1934

1,972,593

UNITED STATES PATENT OFFICE

1,972,593

FURNACE WALL

Walter F. Keenan, Jr., Pelham, N. Y., assignor to Foster Wheeler Corporation, New York, N. Y., a corporation of New York Application May 27, 1926, Serial No. 111,945
In Great Britain April 10, 1926

6 Claims. (Cl. 122—6)

My present invention relates to furnace walls provided with conduits through which fluid is circulated to thereby protect the walls against overheating, and the general object of the invention is to provide an improved wall construction of the kind referred to. More specific objects of the invention are to provide a fluid cooled furnace wall characterized by the relative simplicity of its construction, and the relative low cost at which it can be produced; and by the fact that the cooling fluid conduits are imbedded in refractory material and thereby protected against injurious flame impingement and the corroding action of furnace gases; and by the effective manner in which the conduits reinforce the refractory non-metallic portion of the furnace wall; and by the provision on the conduits of integral metallic projections which contribute to an intimate and extended contact between the metallic conduits and the non-metallic refractory portions of the furnace wall thereby minimizing the number and size of the conduits required to provide an adequate wall cooling effect. The invention is well adapted for use in the ignition arches in, and the outer walls of boiler furnace combustion chambers, but the special characteristics of the improved furnace wall are advantageous in other uses.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described preferred embodiments of my invention.

Of the drawings:

Fig. 1 is an elevation of a portion of a furnace wall viewed from the inner or furnace chamber side of the wall;

Fig. 2 is a section on the line 2—2 of Fig. 1;

Fig. 3 is a section on the line 3—3 of Fig. 1;

Fig. 4 is a section taken similarly to Fig. 2, but on a larger scale and showing only a portion of the apparatus shown in Fig. 2;

Fig. 5 is an elevation of a portion of a wall of modified construction viewed from the inner side of the furnace chamber wall;

Fig. 6 is a section on the broken line 6—6 of Fig. 5; and

Fig. 7 is a section on the line 7—7 of Fig. 6.

In the drawings, and referring first to Figs. 1 to 4, I have illustrated an embodiment of the invention especially devised and adapted for use as a water cooled wall forming a part of the combustion chamber wall of a boiler or analogous furnace, and comprising metal tubes A imbedded in refractory non-metallic material. At its furnace side each tube A is provided with a longitudinally extending metallic fin or rib B which ordinarily is formed of metal plate and is welded to the outer wall of the tube from which the fin or rib projects radially. The spaces between the ribs B are filled by suitable refractory material C which preferably envelopes the tubes A in whole or in large part, and which may extend to the outer face of the wall. As shown in the drawings, however, the outer face of the wall is formed by metal plating or sheathing D, and a second body of material E is interposed between the material C and the plate D. As shown, the tubes A are mechanically anchored to the sheathing or plating D by means of spacer lugs A' welded to the outer sides of the tubes A and abutting at their outer ends against the sheathing D to which they are clamped by bolts passing through the sheathing D and tapped into the lugs A'.

As shown, the layer of material E is thick enough to engage a small portion of the periphery of each tube A at the outer side of the latter. The material E should possess heat insulating properties and may consist of kieselguhr, though advantageously I employ for the purpose a material, such as a form of cement now in commercial use composed principally of mineral wool plus some asbestos and a suitable binder, which can be put in place while in a plastic or semi-plastic condition and which sets under the action of heat absorbed from the furnace without becoming sufficiently rigid to crack as a result of the relative thermal expansion and contraction of the metallic and non-metallic portions of the furnace wall.

The material C must be highly refractory, and I preferably employ for the purpose a material which may be put in place while in an initially plastic or semi-plastic condition, and which sets under the action of heat absorbed from the furnace into a hard rigid material having refractory properties analogous to those of ordinary fire bricks. One known material well adapted for the purpose is called plastic fire brick and is composed of ground fire brick and a clay binder and as put in place is of putty-like consistency. While in its initial putty-like condition, such material is molded about the outer portions of the tubes A and is compacted in the spaces between the ribs B by tamping or by hammering with a mallet, to eliminate voids and to insure close contact between the material C and the ribs B and tubes A. As shown openings B' are formed in the ribs B to receive reinforcing bars F which strengthen the mass of material C, and tend to prevent portions of the latter from falling away in case cracks develop and which have some small cooling effect as a result of their contact with the ribs B.

Advantageously the holes B' are elongated to facilitate the insertion and removal of the bars F which as shown are each of a length a little greater than the distance between the adjacent ribs B. In the preferred construction illustrated the ribs B extend to the furnace chamber side of the wall where their edges are exposed. This provides reinforcement and some cooling for the portion of the material C immediately adjacent the furnace chamber. While the exposed edges of the ribs B absorb heat at a rapid rate from the furnace chamber, the transfer of heat by conduction through the ribs B to the fluid in the tubes A will ordinarily be rapid enough to prevent the ribs from being dangerously overheated.

As shown in Figs. 1 and 2, the tubes A have their upper ends out-turned and passing through the sheathing D and externally of the wall are connected into a header $a$. Through the header $a$ and a similar or other connection to the lower ends of the tubes A, the latter may be connected into a cooling fluid circulating system. For example, when the wall construction is employed as a so-called water wall in a boiler furnace, the tubes A may be connected into the water circulation system of the boiler.

In a co-pending application Serial No. 111,908, filed of even date herewith, I have illustrated and described fluid cooled furnace wall constructions in which wall cooling conduits are employed each of which is exposed for a portion of its length at its furnace chamber side and has another portion covered by refractory material which may be similar to the material C herein described and which is supported and cooled by means of fins welded to the furnace sides of the portions of the tubes covered by refractory material; and in said co-pending application I have claimed certain generic features of invention disclosed but not claimed herein.

Instead of providing the tube A with longitudinal fins as in the constructions shown in Figs. 1 to 4, it is advantageous in some cases to provide each tube A wth a pluralty of transverse fins BA as shown in Figs. 5, 6 and 7, so that when the tubes A are vertically disposed as is usual, each fin BA directly supports the comparatively small portion of the refractory material CA directly above it and between it and the next fin BA above. Advantageously, as shown, the refractory material in which tubes A are embedded, or at least the portion thereof adjacent the furnace chamber side of the wall, is divided along planes transverse ot the wall and parallel to the tubes into sections separated by joints $C^{10}$.

In the particular wall construction illustrated in Figs. 5, 6 and 7, the refractory material in which the tubes A are embedded comprises an outer portion EA which may be of material similar to the material E first described, or may be similar in composition and mode of formation to the material C described above. In either event the material EA is advantageously put in place, and if similar to the material C, should be allowed to set, before the material CA is put in place. The joints $C^{10}$ may advantageously be formed by the use of spacer strips G of card board or the like, one of which is placed midway between each adjacent pair of tubes A as shown in Fig. 7, to separate the adjacent portions of material CA as the latter is being compacted into place. When the furnace is heated up the card board burns away leaving open joints $C^{10}$ which usually fill up quickly with soot and furnace dust but nevertheless accommodate relative expansion and contraction of the parts in a horizontal direction and thereby eliminates or minimizes fracture of the material CA which otherwise would result from such thermal expansion or contraction.

The separation of the portion of the material CA in the furnace chamber side of the wall by the fins BA substantially eliminates any tendency of the material CA to crack as a result of expansion and contraction in a vertical direction. The fins BA ordinarily are steel plate sections each having a curved edge forming a concave seat fitting against the tube A to which the fin is welded along an arc of sufficient length. Each fin BA is advantageously beveled off at its outer edges as indicated at $B^{10}$ so that the portions of the material CA above and below each fin are connected integrally at the outer sides of the bevel edges $B^{10}$ of the fin by integral portions large enough to have considerable strength. All of the lateral surface of each projection BA is thus in intimate contact with the refractory material, and by the term "lateral surface" as used herein, I mean to designate and include all of the surface of each projection except the end surface portion welded to the tube and any end surface portion exposed at the inner face of the wall. The furnace chamber side of the wall so formed is composed of rectangular brick-like bodies of refractory material each of which extends in a vertical direction between an adjacent pair of fins BA, and in a horizontal direction between an adjacent pair of joints $C^{10}$. In the construction shown in Figs. 5, 6, and 7, the tubes A may be anchored to the sheathing plate D by means of projections A' as in the construction first described, and refractory material CA may also be reinforced by bars F extending through and between adjacent fins BA, though there is ordinarily less necessity for these bars with the construction shown in Figs. 5, 6 and 7, than in the construction shown in Figs. 1, 2, 3, and 4, and in either construction the bars F may be omitted when conditions do not require them. The use of the type of construction shown in Figs. 4, 5 and 6 in the combustion chamber walls of powdered coal burning furnaces has been found to possess an especial advantage arising out of an inherent capacity for self perpetuation of a wall so constructed and used as a result of slag deposit on the face of the wall. In such use of a wall so constructed, it has been found that when any portion of the wall is reduced to less than the normal thickness as a result of the spalling away of the refractory facing, or as a result of the burning or melting away of the refractory material during periods in which the combustion chamber temperatures are higher than usual, such wall portion tends to build up quickly to its normal thickness as a result of the adherence thereon in solidified form of the fuel residue coming in contact therewith in the form of molten slag particles. The rapidity with which any thin portion of the wall thus builds up to normal thickness under normal operating conditions is augmented by the increased cooling action at the face of the wall of the cooling tubes of the wall structure at times when the thickness of the refractory material between tubes and the inner face of the wall is less than normal. The horizontal disposition of the metallic projections BA, by retarding the downflow of molten slag along the inner face of the wall and giving the slag more time to cool, also contributes to the rapidity with which the wall is restored to proper thickness by slag accretions.

In a powdered coal furnace having such a combustion chamber wall, the thickness of the refractory wall facing may diminish during any appreciable period of operation with combustion chamber temperatures higher than average, as a result of the melting away of the wall facing. When thereafter the combustion chamber temperatures become lower, the thickness of the wall increases as a result of the adherence of slag to the wall facing. The variation in wall thickness as a result of usual variations in combustion chamber temperatures, is confined between rather narrow limits since the thinning of the wall, due to high temperature operation, is checked after a small reduction in wall thickness by the increased cooling effectiveness at the face of the wall of the metallic wall cooling provisions. Conversely, the thickening of the wall which occurs when combustion chamber temperatures are reduced, is checked by the decrease in effectiveness at the inner face of the wall cooling provisions as the wall thickens. It has been found in extended practical use that a powdered coal burning furnace having the wall construction shown in Figs. 4, 5 and 6 is practically indestructible under conditions which would require the wall, if constructed of uncooled refractories, to be rebuilt at frequent intervals.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. A fluid cooled furnace wall comprising a row of wall cooling tubes with ribs projecting away from the tubes at the furnace side of the row, refractory material placed between said ribs, and supports for said refractory material connected to said ribs and extending transversely of the latter into the spaces between the ribs.

2. A furnace chamber wall comprising refractory material, cooling fluid tubes imbedded therein and having ribs extending to the high temperature side of the wall, and reinforcing bars connecting adjacent ribs.

3. A furnace chamber wall comprising an outer rigid portion, a row of tubes parallel to but spaced away from said rigid wall portion, spaced apart members anchoring said tubes to said wall portion, said tubes having fins at their sides remote from said wall portion, a layer of heat insulating material between the latter and said tubes and surrounding said members, and a refractory heat insulating material filling the spaces between said tubes and their fins and extending from the free edges of the latter into contact with said layer.

4. A furnace chamber wall comprising an outer metallic sheathing, a row of tubes parallel to but spaced away from and mechanically anchored to said sheathing, and having fins at their sides remote from said sheathing, a layer of heat insulating material between the tubes and the sheathing, and a highly refractory non-metallic material filling the spaces between said tubes and their fins and extending from the free edges of the latter into contact with said layer.

5. A fluid cooled furnace wall comprising cooling fluid conduits imbedded in refractory material, the portion of which adjacent the furnace chamber side of the wall is divided into brick-like bodies and plate-like fins welded to the tubes and extending transversely to the latter between said bodies, the said bodies at opposite sides of each fin being integrally connected at the outer side of the fin.

6. A furnace water wall construction of the monolithic type comprising, in combination, a plurality of spaced water tubes; a wall of plastic refractory material extending across and engaging the furnace chamber side of said tubes; means for holding the plastic wall against the tubes; and means providing for the expansion and contraction of the wall; said last-mentioned means comprising a plurality of destructible spacer members embedded within the furnace chamber side of the wall and disposed in planes which are at substantial angles to the plane of the wall so as to provide, after furnace heat is applied, grooves in the furnace chamber face of the wall to permit expansion and contraction of the wall.

WALTER F. KEENAN, JR.